United States Patent
Castaneda Zuniga et al.

(10) Patent No.: US 10,184,014 B2
(45) Date of Patent: Jan. 22, 2019

(54) METHOD FOR PRODUCING CLEAN THERMOPLASTIC PARTICLES

(71) Applicant: SABIC Global Technologies B.V., Bergen op Zoom (NL)

(72) Inventors: Diego Mauricio Castaneda Zuniga, Geleen (NL); Peter Neuteboom, Geleen (NL); Jan Nicolaas Eddy Duchateau, Geleen (NL); Zeljko Knez, Maribor (SI)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 226 days.

(21) Appl. No.: 15/313,572

(22) PCT Filed: Apr. 29, 2015

(86) PCT No.: PCT/EP2015/059413
§ 371 (c)(1),
(2) Date: Nov. 23, 2016

(87) PCT Pub. No.: WO2015/180922
PCT Pub. Date: Dec. 3, 2015

(65) Prior Publication Data
US 2017/0198064 A1    Jul. 13, 2017

(30) Foreign Application Priority Data
May 26, 2014 (EP) .................... 14169838

(51) Int. Cl.
*C08F 6/00* (2006.01)
*C08J 11/08* (2006.01)
*C08F 6/10* (2006.01)
*C08J 3/14* (2006.01)
*C08F 6/12* (2006.01)

(52) U.S. Cl.
CPC ............. *C08F 6/003* (2013.01); *C08F 6/005* (2013.01); *C08J 11/08* (2013.01); *C08F 6/10* (2013.01); *C08F 6/12* (2013.01); *C08J 3/14* (2013.01); *C08J 2323/06* (2013.01); *Y02P 20/544* (2015.11); *Y02W 30/701* (2015.05)

(58) Field of Classification Search
CPC .. C08F 6/001; C08F 6/003; C08F 6/05; C08F 6/06; C08F 6/08; C08F 6/10; C08F 6/12; C08F 6/28; C08J 3/12; C08J 3/14; C08J 3/122; C08J 11/08
See application file for complete search history.

(56) References Cited

U.S. PATENT DOCUMENTS

| 6,056,791 A | 5/2000 | Weidner et al. |
| 2009/0156737 A1 | 6/2009 | Schindler et al. |
| 2009/0156739 A1 | 6/2009 | Kok |

FOREIGN PATENT DOCUMENTS

| DE | 4109527 A1 | 9/1991 |
| EP | 0838318 A2 | 4/1998 |
| EP | 1834978 * | 9/2007 |
| WO | 2009039518 A2 | 3/2009 |

OTHER PUBLICATIONS

EP 1834978, Sep. 2007, machine translation.*
E.J. Kaltenbacher et al., "The Use of Melt Strength in Predicting the Possibility of Polyethylene Extrusion Coating Resins." Tappi; Jan. 1967, pp. 20-28, vol. 50, No. 1.
International Search Report; International Application No. PCT/EP2015/059413; International Filing Date: Apr. 29, 2015; dated Aug. 18, 2015; 3 pages.
P. Tackx et al., "Chain Architecture of LDPE as a Function of Molar Mass Using Size Exclusion Chromatography and Multi-Angle Laser Light Scattering (SEC-MALLS)." Polymer; Sep. 1998, pp. 3109-3113, vol. 39, No. 14.
P.D. Iedema et al, "A Development of MWD and Branching During Peroxide Modification of High-Density Polyethylene by SEC-MALS and Monte Carlo Simulation," Polymer; Jun. 2013, pp. 4093-4104, vol. 54.
Peacock, Andrew J., "Production Processes", Handbook of Polyethylene, Marcel Dekker AG (Ed); 2000, pp. 43-66.
Written Opinon of the International Searching Authority; International Application No. PCT/EP2015/059413; International Filing Date: Apr. 29, 2015; dated Aug. 18, 2015; 4 pages.

* cited by examiner

*Primary Examiner* — Roberto Rabago
(74) *Attorney, Agent, or Firm* — Cantor Colburn LLP

(57) ABSTRACT

A process for increasing purity of a low density polyethylene (LDPE) composition, comprising the steps of: a) providing a melted composition comprising LDPE having Mn of at least 5.0 kg/mol according to size exclusion chromatography, Mw of at least 50 kg/mol according to size exclusion chromatography, a density of 915 to 935 kg/m³ according to ISO1183 and a melt flow rate of 0.10 g/10 min to 80 g/10 min according to ISO1133:2011 measured at 190° C. and 2.16 kg, and b) providing particles from the melted composition by: b1) mixing a supercritical fluid in the melted composition to obtain a solution saturated with the supercritical fluid and b2) expanding the solution through an opening to obtain the particles.

17 Claims, No Drawings

METHOD FOR PRODUCING CLEAN THERMOPLASTIC PARTICLES

CROSS REFERENCE TO RELATED APPLICATIONS

This application is a 371 of International Application No. PCT/EP2015/059413, filed Apr. 29, 2015, which claims priority to European Application No. 14169838.1, filed May 26, 2014, both of which are incorporated by reference in their entirety herein.

The invention relates to a process for increasing purity of a low density polyethylene (LDPE) composition.

One of the known processes for making LDPE is high pressure polymerisation of ethylene. The high pressure polymerisation process of ethylene is disclosed by Andrew Peacock (Handbook of Polyethylene. Marcel Dekker, Inc. ISBN: 0-8247-9546-6; 2000). Peacock describes the free radical chemical processes, the high pressure production facilities and the high pressure reaction conditions. The process may take place in a tubular reactor or in an autoclave reactor.

The high-pressure reactors are suitable both for the preparation of a homopolymer of ethylene and for the preparation of a copolymer of ethylene and one or more comonomers copolymerisable therewith.

High pressure reactors for LDPE can take one of two forms being either an autoclave, with a height-to-diameter ratio in the region of 5-20, or a tubular reactor, with a length-to-diameter ratio from a few hundred up to tens of thousands. These two divergent reactor geometries pose uniquely different chemical engineering problems requiring disparate control conditions. Tubular and autoclave reactors with their disparate profiles require different methods of temperature control.

The autoclave process and the tubular process result in different chain architecture (Tackx and Tacx, Polymer Volume 39, number 14, pp 3109-3113, 1998) and different molecular weight distribution of the polymer (Kaltenbacher, Vol 50, No 1, January 1967, TAPPI). Generally the temperature in the reaction zone of the high pressure reactor ranges between 150° C. and 330° C. and the reactor inlet pressure lies between 50 MPa and 500 MPa where reactor inlet pressure refers to the (total) pressure at which the feed stream leaves the compressor and enters the reactor. Preferably this pressure ranges between 150 MPa and 400 MPa.

During the polymerisation it is possible to add inhibitors, scavengers and/or a chain regulator. Chain transfer is the process by which the growth of a polyethylene chain is terminated in such a way that the free radical associated with it transfers to another molecule on which further chain growth occurs. The molecule to which the free radical is transferred can be either ethylene or a deliberately added chain transfer agent (CTA) such as a solvent molecule. Generally, the effect of adding a chain transfer agent is to reduce the average molecular weight of the resin and as a rule, chain transfer is controlled by altering reaction conditions and by the addition of chain transfer agents.

Additionally, peroxide is typically added together with a peroxide solvent which typically comprises $C_5$-$C_{20}$ normal or iso paraffin.

From the reaction zone the product containing a mixture of LDPE, low molecular weight ethylene derived polymer, peroxide solvent, unreacted ethylene and other contaminants proceeds to a two stage separation process. The product stream is initially let down into a high pressure separator wherein the LDPE precipitates and is drained off with some ethylene to a low pressure separator. The low molecular weight ethylene derived polymer remains in solution in the bulk of the ethylene, and this stream is let down into a separate low pressure separator. Here the ethylene is partially stripped from the oils and waxes, which are discharged in waste stream. Many variants of the separation process exist, with different arrangements of separators that can recycle unreacted ethylene to either or both of the compressors. The LDPE melt is fed into an extruder, where it is homogenized and optionally blended with additives. The product is extruded as thin strands that are chopped into pellets that require a subsequent degassing step typically with air or other inert gases, for example nitrogen, in order to remove the entrained ethylene from the separation steps. Optionally additional degassing steps can take place within the extruder, equipped with special features for that purpose (e.g. forward and/or backward degassing), complicating the design of that part of equipment. These purification steps are time and energy consuming and for the case of silos with venting systems, it can take from 10-18 hours for LDPE homopolymers and even >24 hours for LDPE copolymers.

LDPE obtained via the high pressure radical polymerization of ethylene in an autoclave or a tubular reactor generally has Mn of at least 5.0 kg/mol according to size exclusion chromatography, Mw of at least 50 kg/mol according to size exclusion chromatography, a density of 915 to 935 kg/m³ according to ISO1183 and a melt flow rate of 0.10 g/10 min to 80 g/10 min according to ISO1133:2011 measured at 190° C. and 2.16 kg. Such LDPE is useful for various applications such as packaging, healthcare, extrusion coating, master batches, foam, wire and cable, etc. Such LDPE may also be used for film blowing processes, low load commercial and retail packaging applications and trash bags. Other uses include diaper backing, shrink-wrap, vapor barriers, agricultural ground cover, and greenhouse covers, master batch, extrusion coating/lamination, adhesives, wire & cable insulation, flexible pipe. Injections and blow-molded items (for squeeze bottles and food storage containers) may also be suitable for use of such LDPE.

LDPE obtained contains contaminants which were present in raw materials or generated during reaction, separation, finishing processes (extrusion, pneumatic transportation, degassing) and plant operation (e.g. transitions). Examples of these contaminants include low molecular weight ethylene derived polymers, peroxide solvents, residues of initiators such as peroxides, initiator decomposition products and chain transfer agents. LDPE obtained by autoclave high pressure technology and by tubular reactor technology further contains a certain amount of ethylene as described before.

The presence of these contaminants causes problems for various applications, especially for healthcare, food packaging and wire & cable. This problem is currently tackled by performing additional purification steps for raw materials, intermediates and final products. Another solution is to employ longer transitions for additional equipment cleaning/flushing. Sophisticated designs of extruders and silos with degassing systems have also been used.

It is an object of the present invention to provide a process for increasing purity of an LDPE composition in which above-mentioned and/or other problems are solved.

Accordingly, the present invention provides a process for increasing purity of an LDPE composition, comprising the steps of:

a) providing a melted composition comprising LDPE having Mn of at least 5.0 kg/mol according to size exclusion chromatography, Mw of at least 50 kg/mol according to size exclusion chromatography, a density of 915 to 935 kg/m³ according to ISO1183 and a melt flow rate of 0.10 g/10 min to 80 g/10 min according to ISO1133:2011 measured at 190° C. and 2.16 kg and b) providing particles comprising the LDPE from the melted composition by:

b1) mixing a supercritical fluid in the melted composition to obtain a solution saturated with the supercritical fluid and b2) expanding the solution through an opening to obtain the particles.

According to the process of the invention, high purity LDPE particles are obtained.

Step b) is known as the Particle from Gas Saturated Solutions process (PGSS) and is described in detail e.g. in U.S. Pat. No. 6,056,791 and US2009156739. U.S. Pat. No. 6,056,791 mentions particle formation for glyceride mixtures. LDPE is not mentioned. US2009156737 mentions particle formation of polymeric additives. LDPE is not mentioned.

It is herein understood that the term 'LDPE' includes both an LDPE homopolymer and an LDPE copolymer. The LDPE copolymer is a copolymer of ethylene and a suitable comonomer well known to the skilled person, such as α-olefins with 3-12 C atoms, ethylenically unsaturated carboxylic acids, ethylenically unsaturated C4-15 carboxylic acid esters or their anhydrides. Examples of suitable α-olefins to be applied as a comonomer are propylene and/or butene. Examples of suitable ethylenically unsaturated carboxylic acids are maleic acid, fumaric acid, itaconic acid, acrylic acid, methacrylic acid and/or crotonic acid. Examples of ethylenically unsaturated C4-15 carboxylic acid esters or their anhydrides are methylmethacrylate, ethylacrylate, n-butyl methacrylate, vinyl acetate, methacrylic acid anhydride, maleic acid anhydride, 1,4-butanedioldimethacrylate, hexanediol dimethacrylate, 1,3-butylene glycol dimethacrylate, ethylene glycol dimethacrylate, dodecanediol dimethacrylate, trimethylol propane trimethacrylate, trimethacrylate ester and/or itaconic acid anhydride. Also bifunctional alkadienes for example 1,5-hexadiene, 1,7-octadiene, 1,9-decadiene and 1,13-tetradecadiene may be applied. The quantity of comonomer in the polymer is dependent on the desired application.

Typically, the LDPE has Mn of at most 20.0 kg/mol, for example at most 17.5 kg/mol, according to size exclusion chromatography. Typically, the LDPE has Mw of at most 300 kg/mol, for example at most 250 kg/mol, according to size exclusion chromatography. In some embodiments, the LDPE may have Mn of 5.0-10.0 kg/mol according to size exclusion chromatography and Mw of 50-200 or 50-150 kg/mol according to size exclusion chromatography. In other embodiments, the LDPE may have Mn of 10.0-20.0 kg/mol and Mw of 150-250 or 150-200 kg/mol according to size exclusion chromatography.

It was surprisingly found that the PGSS process of step b) of the process according to the present invention results in the formation of LDPE particles having a high purity. According to the process according to the present invention, particles are formed essentially only from LDPE, while ethylene and other impurities remain in the fluid. The need for further purification steps for LDPE particles is hence eliminated.

Preferably, the LDPE particles obtained by step b) comprise no or essentially no amount of low molecular weight ethylene derived polymers. Low molecular weight ethylene derived polymers are herein understood to mean hydrocarbons with 3-59 carbons. Preferably, the amount of the low molecular weight ethylene derived polymers in the LDPE particles obtained by step b) is at most 1500 ppm, more preferably at most 1000 ppm, more preferably at most 800 ppm, more preferably at most 600 ppm, more preferably at most 500 ppm, more preferably at most 400 ppm, more preferably at most 300 ppm, more preferably at most 200 ppm, more preferably at most 100 ppm, more preferably at most 50 ppm, more preferably at most 30 ppm, more preferably at most 10 ppm, more preferably at most 5 ppm, more preferably at most 1 ppm, more preferably at most 0.1 ppm.

Preferably, the LDPE particles obtained by step b) comprise no or essentially no amount of low molecular weight ethylene derived polymers with 33-59 carbons. More preferably, the LDPE particles obtained by step b) comprise no or essentially no amount of low molecular weight ethylene derived polymers with 31-59 carbons. The presence of such low molecular weight ethylene derived polymers can e.g. be determined by mass spectrometry direct inlet probe system (MS-DIP). MS-DIP detects the number of carbons in the shortest hydrocarbons present in the sample. If the MS-DIP measurement of a sample detects the presence of hydrocarbon with n carbons, it can be understood that the sample contains hydrocarbons with n or more carbons and that the sample does not contain hydrocarbons with less than n carbons. Thus, LDPE particles comprising no or essentially no amount of low molecular weight ethylene derived polymers with 33-59 carbons (or 31-59 carbons) may be understood as LDPE particles comprising no detectable amount of low molecular weight ethylene derived polymers with 33-59 carbons (or 31-59 carbons) by MS-DIP.

Preferably, the amount of the low molecular weight ethylene derived polymers with 10-32 carbons in the LDPE particles as determined by PTV-GC-MS (programmed temperature vaporisation-gas chromatography-mass spectrometry) is at most 1000 ppm, more preferably at most 800 ppm, more preferably at most 600 ppm, more preferably at most 500 ppm, more preferably at most 400 ppm, more preferably at most 300 ppm, more preferably at most 200 ppm, at most 100 ppm, more preferably at most 50 ppm, more preferably at most 30 ppm, more preferably at most 10 ppm, more preferably at most 5 ppm, more preferably at most 1 ppm, more preferably at most 0.1 ppm.

The preferred amounts of some types of the low molecular weight ethylene derived polymers as determined by PTV-GC-MS are as follows:

dodecane: at most 12 ppm, more preferably at most 5 ppm tridecane: at most 0.1 ppm C23 alkene: at most 1 ppm, more preferably at most 0.5 ppm C24 cycloalkane: at most 5 ppm, more preferably at most 3 ppm C32 cycloalkane: at most 0.2 ppm, more preferably at most 0.1 ppm Preferably, the LDPE particles obtained by step b) comprise no or essentially no amount of low molecular weight ethylene derived polymers with 5-20 carbons. Low molecular weight ethylene derived polymers with 5-20 carbons may be residue from $C_5$-$C_{20}$ normal or iso paraffin typically used as a peroxide solvent in the high pressure polymerization process. Preferably, the amount of the low molecular weight ethylene derived polymers with 5-20 carbons in the LDPE particles obtained by step b) is at most at most 800 ppm, more preferably at most 600 ppm, more preferably at most 500 ppm, more preferably at most 400 ppm, more preferably at most 300 ppm, more preferably at most 200 ppm, at most 100 ppm, more preferably at most 50 ppm, more preferably at most 30 ppm, more preferably at most 10 ppm, more preferably at most 5 ppm, more preferably at most 1 ppm, more preferably at most 0.1 ppm.

Preferably, the LDPE particles obtained by step b) comprise no or essentially no amount of low molecular weight ethylene derived polymers with 3-7 carbons. Preferably, the amount of the low molecular weight ethylene derived polymers with 3-7 carbons in the LDPE particles obtained by step b) is at most 100 ppm, more preferably at most 50 ppm, more preferably at most 30 ppm, more preferably at most 10 ppm, more preferably at most 5 ppm, more preferably at most 1 ppm, more preferably at most 0.1 ppm.

Preferably, the LDPE particles obtained by step b) comprise at most 20 ppm of ethylene. Preferably, the amount of ethylene in the LDPE particles obtained by step b) is at most 10 ppm, more preferably at most 5 ppm, more preferably at most 1 ppm, more preferably at most 0.1 ppm.

A further advantage of the process according to the invention is that LDPE particles are obtained which can directly be used for certain applications such as masterbatch and carpet backing. In conventional processes for making LDPE, LDPE pellets are obtained which require mechanical grinding before being used. Such mechanical grinding step can be eliminated according to the process of the invention. Accordingly, the present invention provides use of the particles obtainable by the process according to the invention for masterbatch or carpet backing, wherein the particles are not grinded.

The majority of the melted composition provided in step a) is LDPE. For example, the melted composition provided in step a) comprises at least 95 wt %, at least 97 wt %, at least 98 wt % or at least 99 wt % of the LDPE.

The melted composition provided in step a) comprises impurities such as low molecular weight ethylene derived polymer including peroxide solvent, and ethylene. The amount of the low molecular weight ethylene derived polymer in the melted composition provided in step a) may e.g. be at most 2000 ppm, typically 500-1500 ppm.

The amount of ethylene in the melted composition provided in step a) may e.g. be at most 3000 ppm and is typically 500-3000 ppm, 1000-2800 ppm or 1500-2500 ppm.

Further, the melted composition provided in step a) typically comprises initiators such as organic peroxides, decomposition products of the initiators and chain transfer agents. The LDPE particles obtained by step b) comprises no or essentially no amount of these compounds. Preferably, the amount of decomposition products of the initiators in the LDPE particles obtained by step b) is at most 100 ppm, more preferably at most 50 ppm, more preferably at most 30 ppm, more preferably at most 10 ppm, more preferably at most 5 ppm, more preferably at most 1 ppm, more preferably at most 0.1 ppm.

Examples of the organic peroxides include peroxyester, peroxyketone, peroxyketal and peroxycarbonate such as di-2-ethylhexyl-peroxydicarbonate, diacetylperoxydicarbonate, dicyclohexyl-peroxydicarbonate, tert.-amylperpivalate, cumyl perneodecanoate, tert.-butylperneodecanoate, tert.-butyl perpivalate, tert.-butylpermaleinate, tert.-butylperisononanoate, tert.-butylperbenzoate, tert,-butylperoxy-2-ethylhexanoate. tert.-butyl-hydroperoxide, d-tert. butyl peroxide, di-isopropylbenzol hydroperoxide, di-isononanoyl peroxide, didecanoylperoxide, cumol hydroperoxide, methyl isobutyl ketone hydroperoxide, 2.2-bis-(tert.-butylperoxy)-butane and/or 3.4-dimethyl-3.4-diphenylhexane. Also bifunctional peroxides including for example 2,5-dimethyl-2,5-di-tertiair-butylperoxyhexane, 2,5-dimethyl-2,5-tertiair-peroxyhexyne-3 3,6,9-triethyl-3,6,9-trimethyl-1,4, 7-triperoxonononane, 3,3,6,6,9,9-hexamethyl-1,2,4,5-tetraoxacyclononane, n-ethyl-4,4-di-tertiair-butylperoxyvalerate, 1,1-di-tertiair-butylperoxy-3,3,5-trimethylcyclohexane, ethyl-3,3-di-tertiair-butylperoxybutyrate 1,1-di-tertiair-butylperoxycyclohexane, 2,2-di-tertiair-butylperoxybutane ethyl-3,3-di-tertair-amyl peroxy butyrate, 2,2-di-4,4-di-tertiair-butylperoxycyclohexyl propane, methyl-isobutyl-peroxide, 1,1-di-tertiair-amylperoxycyclohexane, 1,1-di-tertiair-butylperoxycyclohexane, 2,5-di-methyl-2,5-di-2-ethylhexanoylperoxyhexane and 1,4-di-tertiair-butylperoxycarbocyclohexane.

The supercritical fluid may be halogenated hydrocarbons, aliphatic hydrocarbons, cyclic hydrocarbons, aromatic hydrocarbons, esters, ethers. The supercritical fluid may be selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, toluene, pyridine, cyclohexane, cyclohexanol, o-xylene, dimethyl ether and $SF_6$.

It was found that $SF_6$ has a particularly high solubility in the melted LDPE composition which leads to an easier formation of the solution saturated with $SF_6$. The high solubility of the supercritical fluid results in a large increase in the flowability of the melted LDPE composition. This reduces the risk of the clogging of the opening through which the saturated solution is expanded. Additionally, the increase in the flowability of the melted LDPE composition leads to a more uniform particle size, which may be advantageous in certain applications such as carpet backing.

The use of $SF_6$ is particularly advantageous when the LDPE in the melted composition has a low flowability expressed e.g. by a melt flow rate as determined using ISO1133:2011 (190° C./2.16 kg) of less than 70 g/10 min or an even lower melt flow rate of less than 50 g/10 min, less than 30 g/10 min or less than 25 g/10 min. Accordingly, the supercritical fluid is $SF_6$ in some preferred embodiments.

In some embodiments, the LDPE has a melt flow rate as determined using ISO1133:2011 (190° C./2.16 kg) of from 0.10 to 70 g/10 min, 0.10 to 50 g/10 min, 0.10 to 30 g/10 min or 0.10 to 25 g/10 min.

Step b) may be performed by a mixing element. Any mixing elements may be used, such as a static mixer, a stirrer or an extruder. The mixing element is preferably a static mixer. Accordingly, in some embodiments, the mixing is performed using a mixing element, wherein the mixing element is selected from the group consisting of a static mixer, a stirrer and an extruder.

The melted composition provided in step b) typically comprises 99.00-99.90 wt % of LDPE, preferably 99.50-99.90 wt %.

Preferably, step a) involves the steps of:
a1) polymerizing ethylene to obtain a composition comprising LDPE and ethylene,
a2) removing ethylene from the composition of step a1) by a high pressure separator and
a3) removing ethylene from the composition of step a2) by a low pressure separator.

These steps advantageously increase the purity of LDPE in the LDPE composition to be purified. This leads to the increase in the purity of the final LDPE particles.

In step a1), ethylene is polymerized by known methods to provide a composition comprising LDPE. The obtained composition from the reactor still contains a relatively large amount of ethylene, ranging from 60 wt % to 80 wt % depending on the reactor type, operating conditions, (co)

monomer and product characteristics, among other variables. Step a1) is well known and extensively described e.g. in Handbook of Polyethylene by Andrew Peacock (2000; Dekker; ISBN 0824795466) at pages 43-66.

In step a2), the obtained composition is subsequently fed to a high pressure separator which removes ethylene as gas phase. The liquid phase composition comprising LDPE typically comprises from 20 wt % to 30 wt % of ethylene. In the high pressure separator, a typical pressure of 250 barg is applied. The temperature in the high pressure separator is typically from 200 to 350° C.

In step a3), the obtained composition from step a2) is subsequently fed to a low pressure separator which removes ethylene as gas phase. In the low pressure separator, a typical pressure from almost atmospheric to 4 barg is applied. The temperature in the low pressure separator is typically from 200° C. to 280° C. A melted composition typically comprising 99.00-99.90 wt % of LDPE is thereby obtained, which can be subjected to the PGSS.

Alternatively, step a) may also be performed by providing a solid composition comprising LDPE having Mn of at least 5.0 kg/mol according to size exclusion chromatography, Mw of at least 50 kg/mol according to size exclusion chromatography, a density of 915 to 935 kg/m³ according to ISO1183 and a melt flow rate of 0.10 g/10 min to 80 g/10 min according to ISO1133:2011 measured at 190° C. and 2.16 kg, and melting the solid composition.

Step b) is known as the PGSS process.

The PGSS process can be used to create micro-sized particles with the ability to control particle size distribution. PGSS also allows the production of particles that are solvent-free. In the PGSS process, a compressible fluid is introduced under pressure (forming a supercritical fluid) in the polymer to dissolve it (step b1)) and the resultant solution is then expanded so that particles form during the expansion process (step b2)).

The driving force of the PGSS is a sudden temperature drop of the solution below the melting point of the polymer. This occurs as the solution is expanded from a working pressure to atmospheric conditions due to the Joule-Thompson effect. The rapid cooling of the polymer solution causes the crystallization of the polymer. The cooling is sudden and homogeneous throughout the solution; therefore, homogenous nucleation is the method of particle formation. The particles produced are collected in the expansion chamber (spraying tower).

Typically, step b1) is performed by providing in a vessel the melted composition having a temperature of 200° C. to 280° C., pressurizing a highly compressible fluid at a pressure between 250 and 320 bar and mixing the melted composition and the heated highly compressible fluid.

Typically, step b2) is performed by expanding the solution obtained in b2) by means of a throttling device into a spraying tower. Subsequently the obtained particles are removed from the stream of expanded highly compressible fluid. The temperature in the spraying tower is below the melting temperature of the melted composition, e.g. 100-105° C.

The throttling device may be any element which has a suitable opening which provides a diameter restriction which gives the pressure increase. The throttling device includes nozzles, capillaries, valves. The throttling device may also be a part of the vessel before the opening with a reduced diameter The invention is now elucidated by way of the following examples, without however being limited thereto.

The following materials were used:

| | | Density (kg/m³) | Mw (kg/mol) | Mn (kg/mol) | MFR (g/10 min) |
|---|---|---|---|---|---|
| LDPE 1 | 1922T from Sabic | 919 | 110 | 6.9 | 22 |
| LDPE 2 | 1965T from Sabic | 919 | 76 | 5.8 | 65 |

Density is measured according to ISO1183.

Mw and Mn are determined according to size exclusion chromatography.

The size exclusion chromatography was performed according to Iedema et. al., Polymer 54 (2013) pp. 4093-4104, section 2.2 SEC-MALS on p. 4095:

The polymer samples were dissolved (0.9 mg/ml) in 1,2,4-trichlorobenzene (TCB), which was distilled prior to use, over a period of 4 h at 150° C. and stabilized with butylated hydroxytoluene (BHT) at a concentration of 1 mg/ml. The solutions were filtered at high temperature (150° C.) using a millipore filtration setup (1.2 mm) positioned in a Hereous LUT oven operating at 150° C. The separation of the polymer according to molar mass is performed with a Polymer Laboratories PL GPC210. This SEC system is operated at high temperature (column compartment at 160° C., injector compartment at 160° C., and solvent reservoir at 35° C.), and a flow of 0.5 ml/min. Eluent is 1,2,4-trichlorobenzene. Two Polymer Laboratories SEC columns with large particle size (PLGel mixed A-LS 20 mm columns) in series are used to minimize shear degradation of high molar mass polymer chains. The light scattering detector (a WYATT DAWN EOS multi-angle laser light scattering detector) is placed in line between the SEC and the refractive index detector. The used dn/dc=0.097 ml/g.

MFR is measured at 190° C. and 2.16 kg according to ISO 1133:2011.

EXAMPLES

A high pressure/high temperature apparatus for batch micronisation, electrically heated, able to operate from 200 barg up to 300 barg and from 180° C. up to 300° C. (temperature control as accurate as ±1° C.) was filled with LDPE, assembled, purged and pre-pressurized with gas until a pressure of approximately 15 barg was reached. The system was then heated up to 120° C. with injection of additional gas reaching 50 barg. Subsequently the temperature and the pressure were adjusted up to pre-expansion conditions as summarized in Table 1 by adding gas until the system reached equilibrium. An expansion to atmospheric pressure was performed by opening the high pressure valve at the bottom of the equipment, with simultaneous feed of fresh gas preheated to operating temperature at operating pressure to the system. Conditions and gases used for the experiments are shown in Table 1 below. In all cases solidified micronized particles were obtained.

TABLE 1

| Example | Polymer | Gas | Pre-expansion pressure (bar) | Pre-expansion temperature (° C.) |
|---|---|---|---|---|
| 1 | LDPE1 | SF6 | 300 | 250 |
| 2 | LDPE2 | SF6 | 295 | 251 |
| 3 | LDPE2 | CO2 | 305 | 256 |

The levels of impurities in the particles obtained were determined by DIP-MS, as well as the level of impurities in the pellets of LDPE1 and LDPE2.

The particles obtained by examples 1-3 as well as pellets of LDPE1 and LDPE2 were subjected to DIP-MS for the determination of the presence of low molecular weight ethylene derived polymers.

In DIP-MS, solid samples are introduced into a quartz cup located on the tip of a probe, which enters the vacuum chamber through an inlet. The tip of the probe is directly introduced into the ionization chamber, close to the ionization source. In the presence of light volatile material the heat of the filament (supplying the electrons which ionize the molecules) under vacuum conditions is enough to vaporize the components and the detection of the signal begins immediately. Higher-boiling components need more heat to vaporize. Therefore, the temperature at which the vaporization occurs gives an indication of which hydrocarbons are present in the sample. When vaporization starts at a certain temperature, it can be understood that the sample contains hydrocarbons with number of carbons corresponding to said temperature and hydrocarbons with more number of carbons. Hence, a lower starting temperature for the vaporization means that there are hydrocarbons with lower carbon numbers in the sample.

The tip of the probe is heated in a temperature-programmed mode to detect the different components of the sample with a procedure similar to fractional distillation. The complete setup is designed in such a way that a rapid ionization before thermolytic degradation is guaranteed and the heating rate is set to avoid too rapid vaporization of the sample and saturation of the signal.

Results are summarized below.

LDPE2; intensity increase starting at ~155° C. which coincides with the release of ~$C_{34}$ LDPE1; intensity increase starting at ~180° C. which coincides with the release of ~$C_{41}$ Example 1 (LDPE1 treated by SF6); intensity increase starting at ~380° C. which coincides with the release of >$C_{70}$ Example 2 (LDPE2 treated by SF6); intensity increase starting at ~340° C. which coincides with the release of >$C_{70}$ Example 3 (LDPE2 treated by CO2); intensity increase starting at ~270° C. which coincides with the release of ~$C_{60}$ The results show that the particles of Examples 1-3 do not contain detectable amount of low molecular weight ethylene derived polymers with 31-59 carbons, in comparison with the reference materials which contain C34+ polymers (LDPE2 or C41+ polymers (LDPE1).

PTV-GC-MS

The particles obtained by examples 1 and 3 as well as pellets of LDPE1 and LDPE2 were subjected to PTV-GC-MS for the determination of the presence of low molecular weight ethylene derived polymers.

For LDPE1 and LDPE2, 5 gram of the samples was extracted with 200 mL n-hexane using 16 hours boiling under reflux. The extracts were concentrated by evaporating the solvent to 10 ml.

For Example 1 (LDPE1 treated by SF6) and Example 3 (LDPE2 treated by CO2), 0.2 gram of the samples was extracted with 200 mL n-hexane using 16 hours boiling under reflux. The extracts were concentrated by evaporating the solvent to 1 ml.

The extracts were injected to the equipment without further treatment. Calculations were performed against an external standard of naphthalene.

Following PTV-GC-MS equipment was used:
GC Agilent 6890N
Detector Agilent 5973 Mass detector
Autosampler Agilent G2614
Software ChemStation G1701 DA version D.00.01.27
Column Agilent HP5MS 60M*0.250 mm, 1.0 μm film
Injection 50° C., 20 μl
Temperature program Initial 70° C., hold for 0.5 min, ramp 10° C./min until 300° C., hold for 20 min.
Detection 6 min, 30-500 AMU

|  | total amount of C10-C32 (ppm) |
| --- | --- |
| LDPE2 | >560 |
| LDPE1 | >540 |
| Ex 1 | 210 |
| Ex 3 | >480 |

Amounts of some types of hydrocarbons in these samples were found to be as follows (in ppm):

|  | Dodecane | Tridecane | C23 alkene | C24 cycloalkane | C32 cycloalkane |
| --- | --- | --- | --- | --- | --- |
| LDPE2 | >15 | >30 | 4.3 | 12 | 0.4 |
| LDPE1 | >15 | >30 | 3.3 | 10 | 0.4 |
| Ex 1 | 2.3 | 8.0 | 0.6 | 1.4 | <0.1 |
| Ex 3 | 10 | >25 | <0.1 | 2.8 | <0.1 |

The amount of the low molecular weight ethylene derived polymers with C10-C32 carbons is decreased by the PTGG treatment. The decrease by the use of SF6 is especially large.

The invention claimed is:

1. A process for increasing purity of a low density polyethylene (LDPE) composition, comprising the steps of:
   a) providing a melted composition comprising LDPE having Mn of at least 5.0 kg/mol according to size exclusion chromatography, Mw of at least 50 kg/mol according to size exclusion chromatography, a density of 915 to 935 kg/m$^3$ according to ISO1183 and a melt flow rate of 0.10 g/10 min to 80 g/10 min according to ISO1133:2011 measured at 190° C. and 2.16 kg, and
   b) providing particles from the melted composition by:
      b1) mixing a supercritical fluid in the melted composition to obtain a solution saturated with the supercritical fluid and
      b2) expanding the solution through an opening to obtain the particles.

2. The process according to claim 1, wherein the supercritical fluid is selected from the group consisting of $CO_2$, $NH_3$, $H_2O$, $N_2O$, $CH_4$, ethane, propane, propylene, n-butane, i-butane, n-pentane, benzene, methanol, ethanol, isopropanol, isobutanol, chlorotrifluoromethane, monofluoromethane, toluene, pyridine, cyclohexane, cyclohexanol, o-xylene, dimethyl ether and $SF_6$.

3. The process according to claim 1, wherein the supercritical fluid is $SF_6$.

4. The process according to claim 1, wherein the LDPE has a melt flow rate as determined using ISO1133:2011 (190° C./2.16 kg) of from 0.10 to 70 g/10 min.

5. The process according to claim 1, wherein the LDPE particles obtained by step b) comprises essentially no amount of low molecular weight ethylene derived polymers with 31-59 carbons as determined by mass spectrometry direct inlet probe system.

6. The process according to claim 1, wherein the LDPE particles obtained by step b) comprise at most 1000 ppm of low molecular weight ethylene derived polymers with 10-32 carbons as determined by programmed temperature vaporisation-gas chromatography-mass spectrometry.

7. The process according to claim 1, wherein the mixing is performed using a mixing element, wherein the mixing element is selected from the group consisting of a static mixer, a stirrer and an extruder.

8. The process according to claim 1, wherein the melted composition provided in step a) comprises at least 95 wt % of the LDPE.

9. The process according to claim 1, wherein step a) involves the steps of:
   a1) polymerizing ethylene to obtain a composition comprising LDPE and ethylene,
   a2) removing ethylene from the composition of step a1) by a high pressure separator and
   a3) removing ethylene from the composition of step a2) by a low pressure separator to obtain the melted composition.

10. The process according to claim 1, wherein step a) involves the steps of providing a solid composition comprising the LDPE having Mn of at least 5.0 kg/mol according to size exclusion chromatography, Mw of at least 50 kg/mol according to size exclusion chromatography, a density of 915 to 935 kg/m$^3$ according to ISO1183 and a melt flow rate of 0.10 g/10 min to 80 g/10 min according to ISO1133:2011 measured at 190° C. and 2.16 kg and melting the solid composition.

11. A process for making a master batch, comprising forming a masterbatch of the particles produced according to the process of claim 1, wherein the particles are not grinded.

12. The masterbatch according to claim 11.

13. A process for making a carpet backing, comprising forming a carpet backing from the particles produced according to the process of claim 1, wherein the particles are not grinded.

14. The carpet backing according to claim 13.

15. A process for increasing purity of a low density polyethylene (LDPE) composition, comprising the steps of:
   a) providing a melted composition comprising at least 97 wt % LDPE having Mn of at least 5.0 kg/mol according to size exclusion chromatography, Mw of at least 50 kg/mol according to size exclusion chromatography, a density of 915 to 935 kg/m$^3$ according to ISO1183 and a melt flow rate of 0.10 g/10 min to 80 g/10 min according to ISO1133:2011 measured at 190° C. and 2.16 kg, by
      a1) polymerizing ethylene to obtain a composition comprising LDPE and ethylene,
      a2) removing ethylene from the composition of step a1) by a high pressure separator and
      a3) removing ethylene from the composition of step a2) by a low pressure separator to obtain the melted composition, and
   b) providing particles from the melted composition by:
      b1) mixing a supercritical fluid in the melted composition to obtain a solution saturated with the supercritical fluid and
      b2) expanding the solution through an opening to obtain the particles,
   wherein the LDPE particles obtained by step b) comprise at most 500 ppm of low molecular weight ethylene derived polymers with 10-32 carbons as determined by programmed temperature vaporisation-gas chromatography-mass spectrometry.

16. The process according to claim 15, wherein the LDPE particles obtained by step b) comprises essentially no amount of low molecular weight ethylene derived polymers with 31-59 carbons as determined by mass spectrometry direct inlet probe system.

17. The process according to claim 15, wherein the LDPE has a melt flow rate as determined using ISO1133:2011 (190° C./2.16 kg) of 0.10 to 50 g/10 min.

* * * * *